(12) United States Patent
Morita

(10) Patent No.: US 9,025,207 B2
(45) Date of Patent: May 5, 2015

(54) IMAGE PROCESSING APPARATUS OPERATIVE TO PERFORM TRAPPING PROCESS, IMAGE PROCESSING METHOD, AND STORAGE MEDIUM

(71) Applicant: Canon Kabushiki Kaisha, Tokyo (JP)

(72) Inventor: Seijiro Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/710,034

(22) Filed: Dec. 10, 2012

(65) Prior Publication Data

US 2013/0148141 A1 Jun. 13, 2013

(30) Foreign Application Priority Data

Dec. 13, 2011 (JP) ................................. 2011-272156

(51) Int. Cl.
*H04N 1/40* (2006.01)
*H04N 1/60* (2006.01)
*H04N 1/58* (2006.01)

(52) U.S. Cl.
CPC ... *H04N 1/60* (2013.01); *H04N 1/58* (2013.01)

(58) Field of Classification Search
USPC ................................................. 358/1.9, 3.24
See application file for complete search history.

(56) References Cited

U.S. PATENT DOCUMENTS

| 5,473,748 A | * | 12/1995 | Date et al. | 345/536 |
| 8,437,045 B2 | * | 5/2013 | Yao et al. | 358/3.06 |
| 2008/0007752 A1 | * | 1/2008 | Gandhi et al. | 358/1.9 |
| 2008/0145072 A1 | * | 6/2008 | Eguchi | 399/28 |

FOREIGN PATENT DOCUMENTS

| JP | 2007068048 A | * | 3/2007 |
| JP | 2008-141623 A | | 6/2008 |

* cited by examiner

*Primary Examiner* — Barbara Reinier
(74) *Attorney, Agent, or Firm* — Canon USA Inc. IP Division

(57) ABSTRACT

An image processing apparatus includes a determination unit and a trap unit. The determination unit is configured to determine for each of a plurality of color plates whether trapping processing is performed at a position of a target pixel of an image divided to the plurality of color plates. The trap unit is configured to perform the trapping processing at the position of the target pixel for each of the plurality of color plates based on a determination result of the determination unit. In a case where the determination unit determines that the trapping processing is performed on a predetermined color plate, the trap unit does not perform the trapping processing at the position of the target pixel for the color plate on which the trapping processing is performed according to the determination by the determination unit.

21 Claims, 9 Drawing Sheets

DIVIDED IMAGE
- Y
- M
- C
- K

FIG.9A  FIG.9B  FIG.9C
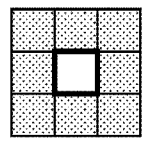 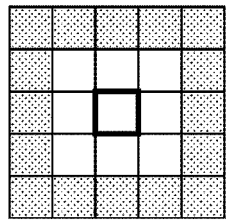 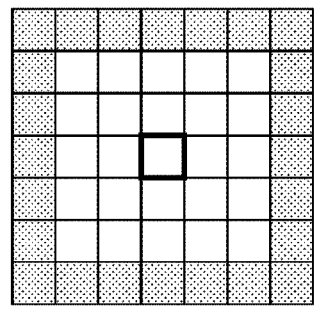
 TARGET PIXEL
 REFERENCE PIXEL GROUP

IMAGE PROCESSING APPARATUS OPERATIVE TO PERFORM TRAPPING PROCESS, IMAGE PROCESSING METHOD, AND STORAGE MEDIUM

BACKGROUND OF THE INVENTION

1. Field of the Invention

The present invention relates to trapping for preventing a white spot caused by plate misregistration.

2. Description of the Related Art

There is an image forming apparatus configured to print a full color image by overlapping images which are divided into a plurality of color plates, on a sheet. When misalignment (plate misregistration) is caused between the color plates in a case where images of the color plates are superimposed, a white spot appears on the boundary between image objects of different color plates, which brings the ground color of the sheet into sight. Trapping processing is performed in order to suppress the generation of the white spot. The trapping processing extends the region of the image object of one color plate so that the region of the image object of one color plate overlaps with the region of the image object of the other color plate.

Because the trapping processing causes the image objects to overlap with each other, the trapping processing can suppress the generation of the white spot even when the plate misregistration is caused. However, because the trapping processing causes the image object of one color plate to overlap with the image object of the other color plate, two colors are mixed in the edge portion of the image object, to cause a tint change. Therefore, it is important to suppress the visual influence caused by the tint change in the edge portion of the image object while preventing the white spot caused by the plate misregistration in the trapping processing.

Japanese Patent Application Laid-Open No. 2008-141623 discusses an image forming apparatus which decides whether to perform trapping processing for a color plate other than a black color plate (K plate) and performs the trapping processing. The image forming apparatus considers the concentration of a surrounding pixel of an object pixel of the trapping processing, and does not perform the trapping processing, for example, on a clearance sandwiched between two image objects to suppress the visual change on the boundary between the image objects.

FIG. 8A illustrates an image in which an image object (background) including a magenta color plate (M plate) is adjacent to an image object (character "F") including an image of a K plate, and an image of a cyan color plate (C plate). A positional relationship between color plates in a region surrounded with dashed lines of FIG. 8A is illustrated in an arrangement pattern 801 of FIG. 8B. A dashed line extending in a longitudinal direction illustrated in FIG. 8B illustrates the boundary between an image object (character "F") and an image object (background) when the image objects are ideally arranged.

The image forming apparatus discussed in Japanese Patent Application Laid-Open No. 2008-141623 performs the trapping processing on the C plate and the M plate other than the K plate in the image of the arrangement pattern 801 to produce the image of an arrangement pattern 802. In such a case, in the image of the arrangement pattern 802, a bluish color (the mixed color of the C plate and the M plate) which is not produced when the character "F" (the mixed color of the K plate and the C plate) and the background (the M plate) overlap with each other appears on the boundary between the character "F" and the background by performing the trapping processing. If the plate misregistration is caused when printing is performed based on the image of the arrangement pattern 802, the image of an arrangement pattern 803 may be printed. That is, the overlap region of the C plate and the M plate is enlarged, which causes a conspicuous bluish color (the mixed color of the C plate and the M plate).

When the trapping processing is performed on the K plate as on the C plate, the overlap region can be made smaller than the arrangement pattern 803. However, because the region extension of the K plate which is a conspicuous color causes a large visual change, the region extension is not desirable.

SUMMARY OF THE INVENTION

The present invention is directed to performing trapping processing for preventing a white spot while suppressing a visual change in a boundary of an image object.

According to an aspect of the present invention, an image processing apparatus of the present invention includes: a determination unit configured to determine for each of a plurality of color plates whether trapping processing is performed at a position of a target pixel of an image divided to the plurality of color plates; and a trap unit configured to perform the trapping processing at the position of the target pixel for each of the plurality of color plates based on a determination result of the determination unit, wherein in a case where the determination unit determines that the trapping processing is performed on a predetermined color plate, the trap unit does not perform the trapping processing at the position of the target pixel for the color plate on which the trapping processing is performed according to the determination by the determination unit.

Because the present invention determines whether the trapping processing for the predetermined color plate should be performed, and does not perform the trapping processing based on the determination result, the present invention can prevent the white spot while suppressing the visual change.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A, 9B, and 9C describe a reference pixel group according to an embodiment of the present invention.

DESCRIPTION OF THE EMBODIMENTS

Various exemplary embodiments, features, and aspects of the invention will be described in detail below with reference to the drawings.

Hereinafter, an image forming apparatus is a digital composite device. However, the image forming apparatus may be the other printing device such as a color copying machine or a color printer.

[Configuration of Image Forming Apparatus]

Figure 1:
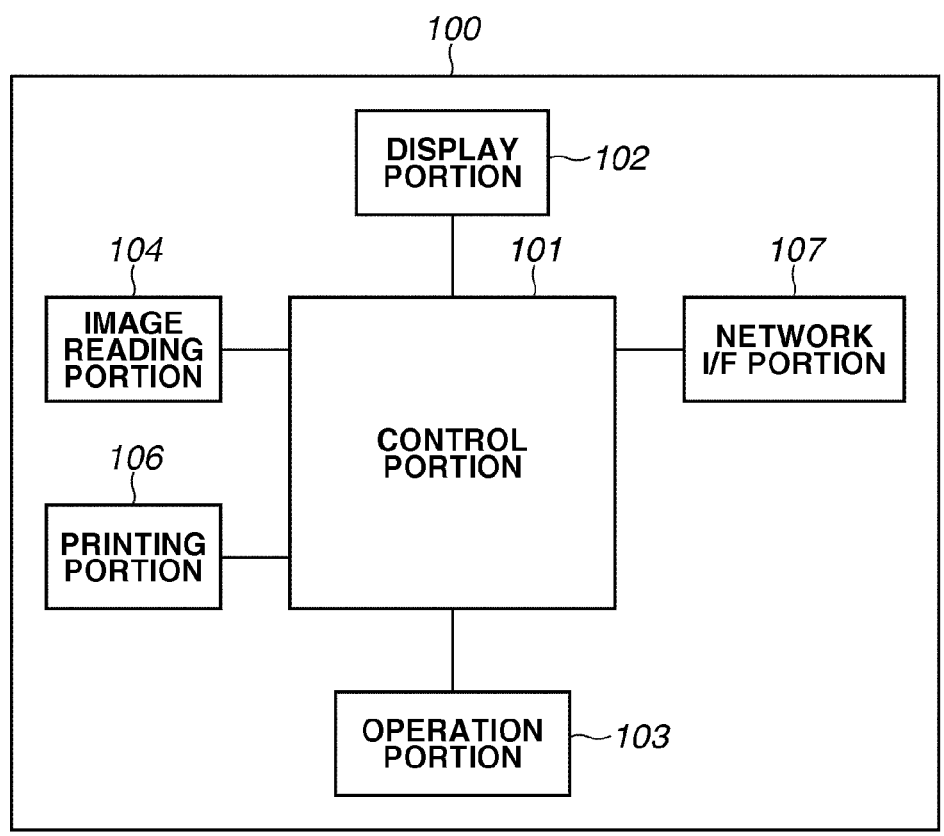
FIG. 1 is a block diagram describing an example of the configuration of an image forming apparatus.

FIG. 1 is a block diagram describing the configuration of a color image forming apparatus (hereinafter, merely referred to as an image forming apparatus) 100 according to the present first exemplary embodiment.

The image forming apparatus 100 is, for example, a multi function peripheral (MFP) which is a composite device having a plurality of types of functions, or a printer having only a print function. The image forming apparatus 100 has a control portion 101. The control portion 101 comprehensively controls the operation of each processing portion of the image forming apparatus 100.

The control portion 101 is connected to a network through a network I/F portion 107, and exchanges various types of information such as print data with an external device such as a PC connected to the network. For example, when the PC transmits the print data which should be printed, to the image forming apparatus 100, the control portion 101 receives the print data through the network I/F portion 107. The control portion 101 applies image processing to the print data to produce data which can be printed by a printing portion 106. The control portion 101 transmits the produced data as a video signal to a printing portion 106. A series of processing will be described later with reference to FIG. 2.

The control portion 101 is connected to an image reading portion 104 including a platen and an auto document feeder (ADF). The image reading portion 104 illuminates, with a light source, an original document image on the platen, and forms, with a lens, an image reflected off the document, on a solid-state image pickup element (not illustrated). Thus, the image reading portion 104 can obtain a raster-shaped image per page with a predetermined density (for example, 600 dpi) based on a raster-shaped image signal from the solid-state image pickup element. Although, in the present exemplary embodiment, as an original document to be read by the image reading portion 104, a paper document is described as an example, a printed material such as a recording medium (for example, a transparent original document such as an OHP sheet or a film or cloth) other than paper may also be read by the image reading portion 104.

The control portion 101 applies image processing to the raster-shaped image corresponding to the image signal read by the image reading portion 104 to produce data which can be printed by the printing portion 106. The control portion 101 transmits the produced data as a video signal to the printing portion 106.

The printing portion 106 prints a color image on a recording medium based on the received video signal. In the present exemplary embodiment, the printing portion 106 is a printer engine of a laser printer of a tandem system having an image formation unit for each color plate. However, the printing portion 106 may be a printer engine of the other form as long as the printing portion 106 forms the color image. The operation of the printing portion 106 is controlled by the control portion 101.

An operation portion 103 is configured to input various types of setting information for controlling the operation of the image forming apparatus 100 based on an instruction from a user. The operation portion 103 is controlled by the control portion 101. A display portion 102 displays an input state in the operation portion 103, image data during processing, and a state of the image forming apparatus 100 to the user. The control portion 101 controls also the operation of the display portion 102. The operation portion 103 and the display portion 102 in the present exemplary embodiment are user interfaces configured to provide an input unit and a display unit for various types of setting information in the image forming apparatus 100, to the user.

[Configuration of Control Portion]

Figure 2:
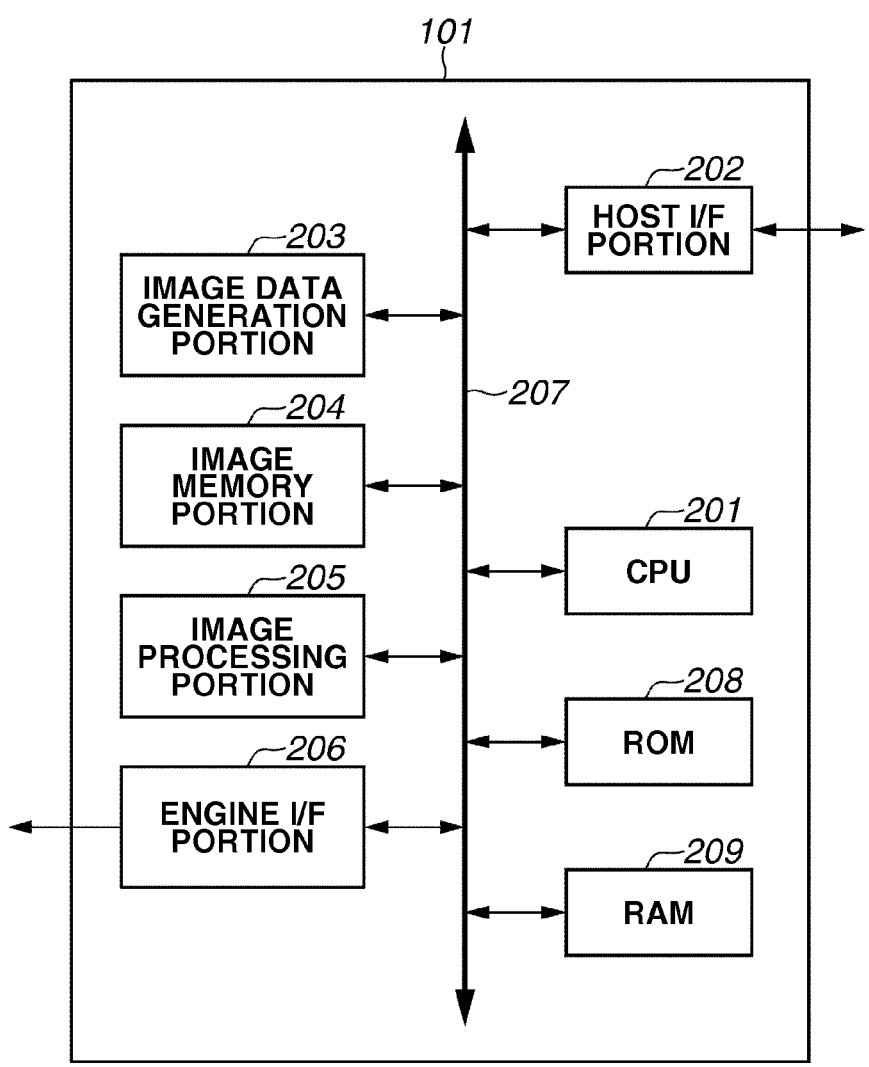
FIG. 2 is a block diagram illustrating an example of the configuration of a control portion of the image forming apparatus.

Next, the detailed configuration of the control portion 101 will be described with reference to FIG. 2. FIG. 2 is a block diagram illustrating the detailed configuration of the control portion 101 according to an embodiment of the present invention.

The control portion 101 has a CPU 201. The CPU 201 comprehensively controls each portion in the control portion 101 according to information received through the operation portion 103 or the network I/F portion 107. This control is executed based on a control program stored in a ROM 208. The control program stored in the ROM 208 includes an OS for performing time division control with a system clock on each load module referred to as a task. The control program includes a plurality of load modules which are controlled by the OS on an individual function basis.

A RAM 209 is used as an operation region for computation processing performed by the CPU 201. Each portion including the CPU 201 is connected to a system bus 207. The system bus 207 includes an address bus, a data bus, and a control signal bus.

The control portion 101 includes a host I/F portion 202, and transmits and receives data to/from each processing portion illustrated in FIG. 1 through the host I/F portion 202. Hereinafter, the operation of the control portion 101 when the print data is received from the external device through the network I/F portion 107 will be described in detail.

First, the host I/F portion 202 transmits the received print data to an image data generation portion 203. Herein, the received print data is, for example, PDL (page description language) data.

Next, the image data generation portion 203 performs analysis on the print data. When the print data is the PDL data, the image data generation portion 203 performs PDL analysis processing. The image data generation portion 203 then produces an intermediate language from the result of the analysis, and further produces bitmap data on which processing can be performed by an image processing portion 205. Specifically, the image data generation portion 203 performs analysis on the print data and creates intermediate language information based on the analysis, and performs rasterizing processing in parallel with the creation of the intermediate language information. This rasterizing processing includes conversion from display colors RGB (additive color mixing) included in the print data into YMCK (subtractive color mixing) on which processing can be performed by the printing portion 106.

This processing also includes processing such as conversion from a character code included in the print data into previously stored font data such as a bit pattern or an outline font. Thereafter, in the rasterizing processing, the image data generation portion 203 creates the bitmap data either on each page or in each band. Then, the image processing portion 205 produces the bitmap data on which print processing can be performed. The image data generation portion 203 stores the produced bitmap data in an image memory portion 204.

Next, the image processing portion 205 applies trapping processing to be described later with reference to FIGS. 3 to 5, or halftone processing using a dither pattern on the bitmap data read from the image memory portion 204. This trapping processing is performed by a trapping processing portion (not illustrated) included in the image processing portion 205. Thus, the image processing portion 205 applies image processing such as the trapping processing to the bitmap data to produce halftone data on which print processing can be performed by the printing portion 106, and stores the halftone data in the image memory portion 204 again.

The trapping processing in the present exemplary embodiment is performed on the bitmap data after the rasterizing processing. The technical thought discussed in the present invention can be also applied to the trapping processing performed on an object basis in the raster-shaped image processing.

An engine I/F portion 206 reads the halftone data (image data) stored in the image memory portion 204, and transmits the halftone data as the video signal to the printing portion 106.

The series of the processing are performed, and thereby the print data received through the network I/F portion 107 is printed.

[Configuration of Trapping Processing Portion]

Next, the trapping processing which is a feature of the present exemplary embodiment will be described with reference to FIGS. 3 to 5. The trapping processing is performed on the bitmap data after the rasterizing processing. The bitmap data includes at least two color plates. Herein, the bitmap data will be described which is divided into four color plates of a yellow plate (Y plate), a magenta plate (M plate), a cyan plate (C plate), and a black plate (K plate). They are color spaces on which processing can be performed by the printing portion 106. In the following present exemplary embodiment, for convenience of description, the trapping processing in a target pixel will be described. However, the processing is actually performed on all the pixels of the bitmap data.

Figure 3:
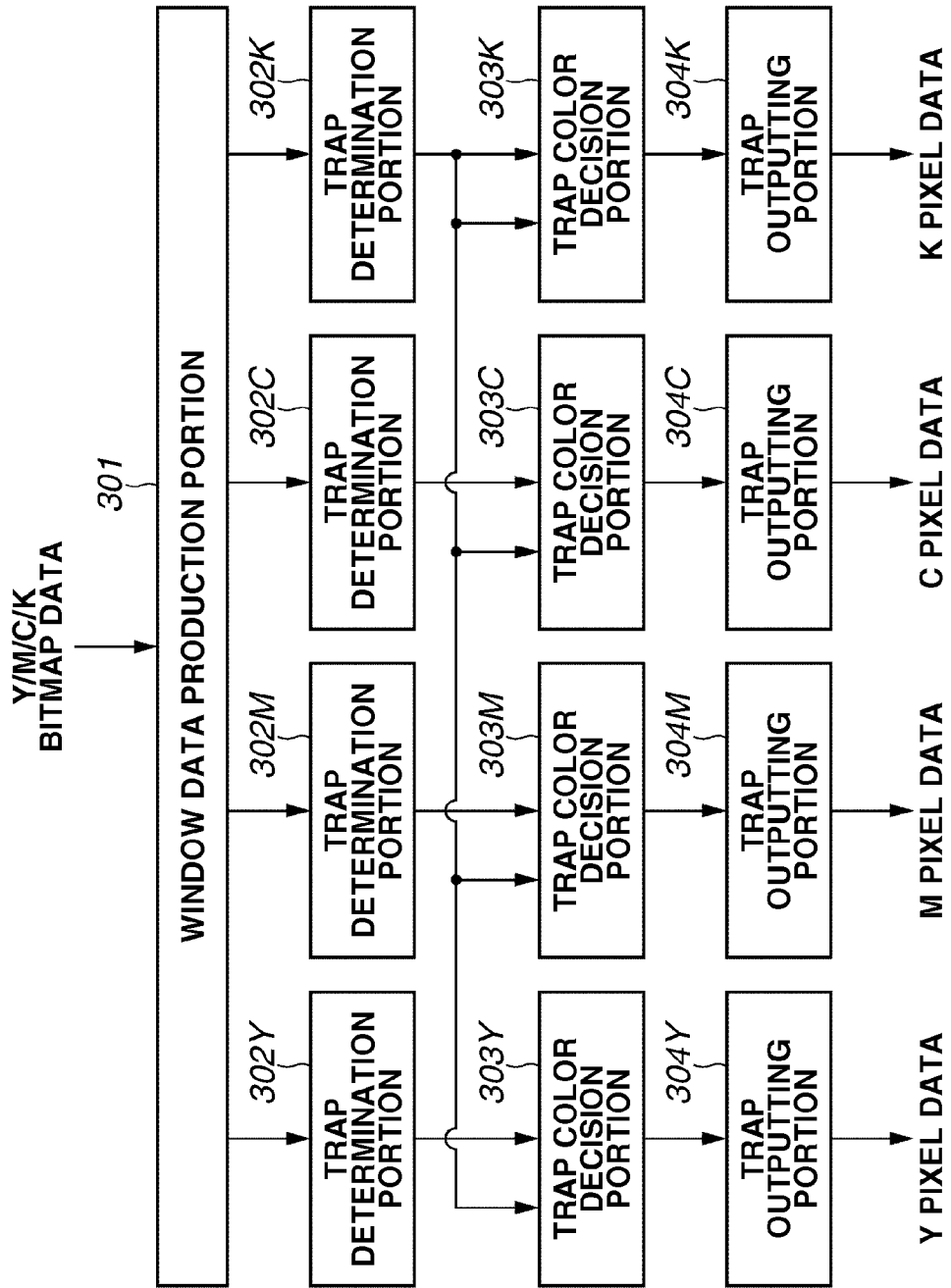
FIG. 3 describes the configuration of a trapping processing portion according to a first exemplary embodiment of the present invention.

FIG. 3 is a block diagram illustrating the trapping processing portion configured to perform the trapping processing.

A window data production portion 301 produces bitmap data of N×N pixels (hereinafter, window data) from the bitmap data read from the image memory portion 204 using a data buffer (not illustrated), and transmits the data to trap determination portions 302Y, 302M, 302C, and 302K. The window data includes the bitmap data of each color plate. When the processing is performed using the window data, the pixel of the center position of the window data is referred to as a target pixel. A pixel other than the target pixel is referred to as a reference pixel.

The trapping processing is performed using the window data. The trapping processing is processing for replacing the pixel value of the target pixel with a value based on the pixel value of the reference pixel. In a series of processing on the bitmap data of the Y plate performed from a trap determination portion 302Y to a trap outputting portion 304Y after the processing of the window data production portion 301, the Y plate is referred to as the target plate, and the other color plate is referred to as the reference plate. The M plate, the C plate, and the K plate are similarly processed.

The trap determination portion 302 (302Y, 302M, 302C, 302K) performs the following processing (trap determination processing). The processing will be described in detail later with reference to FIG. 5.

The trap determination portion 302Y determines whether the trapping processing should be performed on the Y plate, and transmits the determination result to a trap color decision portion 303Y.

The trap determination portion 302M determines whether the trapping processing should be performed on the M plate, and transmits the determination result to a trap color decision portion 303M.

The trap determination portion 302C determines whether the trapping processing should be performed on the C plate, and transmits the determination result to a trap color decision portion 303C.

The trap determination portion 302K determines whether the trapping processing should be performed on the K plate, and transmits the determination result to the trap color decision portions 303Y, 303M, 303C, and 303K.

Then, a trap color decision portion 303 (303Y, 303M, 303C, 303K) executes processing (trap color decision processing) described in detail with reference to FIG. 4. This processing can suppress the spread of color oozing as illustrated in arrangement patterns 801 to 803 of FIG. 8B while performing the trapping processing on the plates other than the K plate. The outline of the processing is as follows.

The trap color decision portion 303Y decides a trap color of the target pixel of the Y plate based on the determination result received from the trap determination portions 302Y and 302K, and transmits the decided trap color to the trap outputting portion 304Y.

The trap color decision portion 303M decides a trap color of the target pixel of the M plate based on the determination result received from the trap determination portions 302M and 302K, and transmits the decided trap color to a trap outputting portion 304M.

The trap color decision portion 303C decides a trap color of the target pixel of the C plate based on the determination result received from the trap determination portions 302C and 302K, and transmits the decided trap color to a trap outputting portion 304C.

The trap color decision portion 303K decides a trap color of the target pixel of the K plate based on the determination result received from the trap determination portion 302K, and transmits the decided trap color to a trap outputting portion 304K.

Then, a trap outputting portion 304 (304Y, 304M, 304C, 304K) performs output processing of the bitmap data of the target pixel. The trap outputting portion 304 calculates the pixel value of the target pixel of the target plate which should be output based on the pixel value of the target pixel of the target plate, and the value of the trap color decided by the trap color decision portion 303, and outputs the bitmap data of the calculated pixel value.

As one example, when the value of the trap color is equal to or greater than the pixel value of the target pixel of the target plate, the trap outputting portion 304 replaces the pixel value of the target pixel with the value of the trap color, and outputs the value of the trap color. When the value of the trap color is less than the pixel value of the target pixel of the target plate, the trap outputting portion 304 outputs the pixel value of the target pixel as it is.

As described above, the trapping processing portion of the image processing portion 205 applies the trapping processing to the bitmap data corresponding to one page.

Hereinafter, the processing of the trap determination portion 302 and the trap color decision portion 303 will be described in detail.

[Trap Determination Portion]

Figure 5:
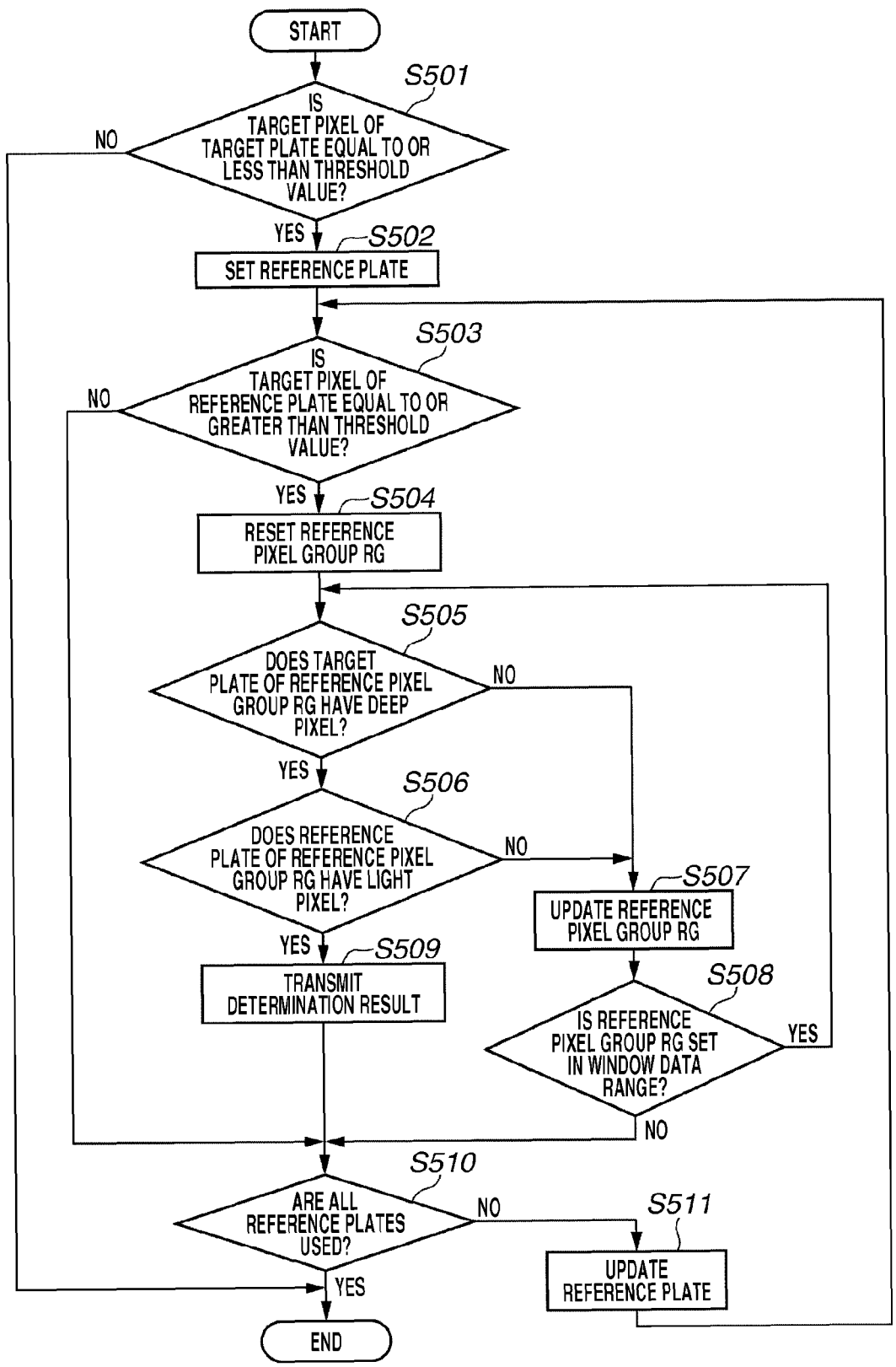
FIG. 5 describes trap determination processing according to the first exemplary embodiment of the present invention.

FIG. 5 is a flow chart illustrating the processing of the trap determination portions 302Y, 302M, 302C, and 302K. The processing according to this flow chart is the same among each color plate. The processing is applied to the window data received from the window data production portion 301.

In step S501, the trap determination portion 302 determines whether the pixel value of the target pixel of the target plate is equal to or less than a first threshold value. When the pixel value of the target pixel of the target plate is greater than the first threshold value, the trap determination portion 302 transmits the determination result indicating that the trapping processing should not be performed on the trap color decision portion 303, and ends the trap determination processing for the window data. This is because the trap determination portion 302 can determine that there is no need to further thicken the target pixel by the trapping processing because the target pixel of the target plate is sufficiently deep.

When the target pixel of the target plate is equal to or less than the first threshold value in step S501, the trap determination portion 302 sets the color plate of the reference plate to be compared with the target plate in step S502. For example, when the target plate is the Y plate, the M plate, the C plate, or the K plate is set as the set reference plate.

Next, in step S503, the trap determination portion 302 determines whether the pixel value of the target pixel of the reference plate is equal to or greater than a second threshold value. If the reference plate is the last color plate which can be set when the pixel value of the target pixel of the reference plate is smaller than the second threshold value, the trap determination portion 302 transmits the determination result indicating that the trapping processing should not be performed on the trap color decision portion 303.

The trap determination portion 302 ends the trap determination processing for the current window data. This is because the trap determination portion 302 can determine that there is no need to perform the trapping processing because the value of the target pixel of the reference plate is light and the influence of plate misregistration is not visually conspicuous even when the plate misregistration is caused.

When the target pixel value of the reference plate is equal to or greater than the second threshold value, in step S504, the trap determination portion 302 sets a reference pixel group RG that indicates a pixel of a specific distance from among the window data which is used as the reference pixel (surrounding pixel). For example, as illustrated in FIG. 9A by slanted lines, the reference pixel group RG is set so that a pixel adjacent to the target pixel is first set as the reference pixel.

Next, in step S505, the trap determination portion 302 determines whether the pixel of the target plate in the reference pixel group, illustrated by the reference pixel group RG has a deep pixel. As one example of the determination, the trap determination portion 302 may determine whether a number of the pixel of the target plate having a pixel value greater than a predetermined threshold value is equal to or greater than a predetermined number. When the trap determination portion 302 determines the deep pixel does not exist in the pixel of the target plate in step S505, the processing proceeds to step S507. Otherwise, the processing proceeds to step S506.

In step S506, the trap determination portion 302 determines whether the pixel of the reference plate in the reference pixel group, illustrated by the reference pixel group RG has a light pixel. As one example of the determination, the trap determination portion 302 may determine whether a number of the pixel of the target plate having a pixel value less than a predetermined threshold value is equal to or greater than a predetermined number. When the trap determination portion 302 determines the light pixel does not exist in the pixel of the reference plate in step S506, the processing proceeds to step S507. Otherwise, the processing proceeds to step S509.

The processing of the above-mentioned steps S501, S503, S505, and S506 determine whether the target pixel is the boundary (edge portion) of an image. Further, the necessity of the trapping processing of the target plate is determined, i.e., whether it is necessary to distribute the deep pixel value of the reference pixel to the light pixel value of the target pixel. Therefore, in step S509, the trap determination portion 302 transmits the determination result indicating that the trapping processing should be performed on the trap color decision portion 303. Further, the trap determination portion 302 transmits trapping information (the color plate of the reference plate, the set reference pixel group RG, the pixel value of the reference pixel of the target plate) when obtaining the determination result, to the trap color decision portion 303.

On the other hand, in step S507, as illustrated in FIGS. 9B and 9C, the trap determination portion 302 updates the setting so that the reference pixel group RG is extended.

In step S508, the trap determination portion 302 determines whether the reference pixel group RG is set in the range of the window data. When the reference pixel group RG is not set in the range of the window data, the trap determination portion 302 advances the processing to step S510. If the reference plate is the last color plate which can be set in this case, the trap determination portion 302 transmits the determination result indicating that the trapping processing should not be performed on the trap color decision portion 303. On the other hand, when the reference pixel group RG is set in the range of the window data, the trap determination portion 302 advances the processing to step S503.

In step S510, the trap determination portion 302 determines whether steps S503 to S509 are performed using the reference plates of all the color plates. When the trap determination portion 302 does not determine that steps S503 to S509 are performed using the reference plates of all the color plates, in step S511, the trap determination portion 302 sets (updates) the reference plate to the other color plate, and advances the processing to step S503. On the other hand, when the trap determination portion 302 determines that steps S503 to S509 are performed using the reference plates of all the color plates, the trap determination portion 302 ends the trap determination processing for the window.

The trap determination portion 302 sequentially changes the color plate of the reference plate in the flow chart of the processing of the trap determination portion 302 illustrated in FIG. 5 to perform the trap determination. However, the trap determination portion 302 may multiply the pixel value of each color plate of the reference plate by a weight coefficient for each color plate and perform the trap determination using the pixel value obtained by adding the pixel values.

As described above, the trap determination portion 302 determines whether the trapping processing should be performed.

[Trap Color Decision Portion]

Figure 4:
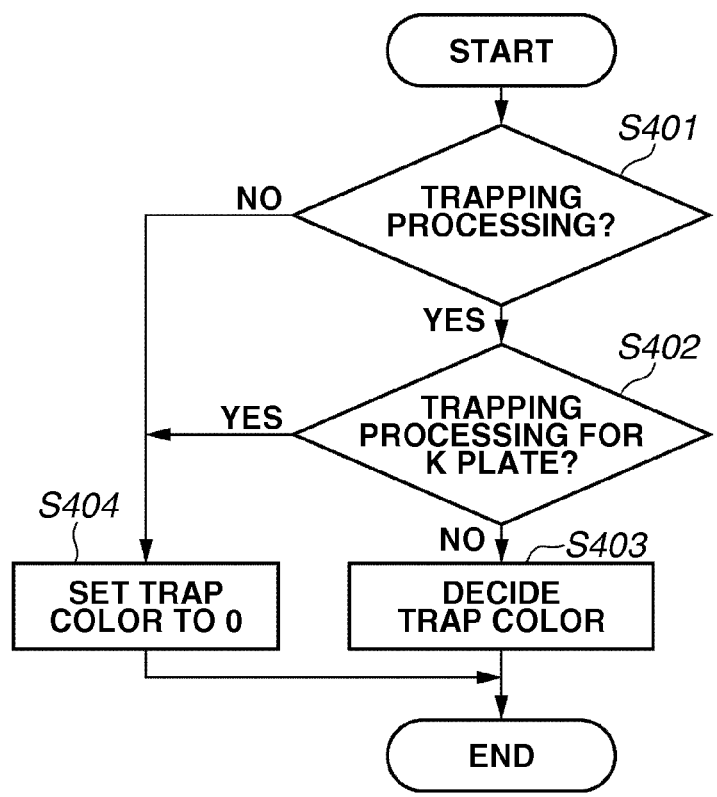
FIG. 4 describes trap color decision processing according to the first exemplary embodiment of the present invention.

FIG. 4 is a flow chart illustrating processing of the trap color decision portions 303Y, 303M, 303C, and 303K. The processing according to this flow chart is the same among each color plate.

In step S401, the trap color decision portion 303 determines whether the determination result received by the target plate from the trap determination portion 302 indicates that the trapping processing should be performed. When the determination result indicates that the trapping processing should be performed ("Yes" in step S401), the trap color decision portion 303 advances the processing step S402. If this is not the case ("No" in step S401), the trap color decision portion 303 advances the processing to step S404.

In step S402, the trap color decision portion 303 determines whether the determination result (the determination result of the trap determination processing for the predetermined color plate) of the trap determination portion 302 relating to the K plate indicates that the trapping processing should be performed. When the determination result indicates that the trapping processing should not be performed on the K plate ("No" in step S402), the trap color decision portion 303 advances the processing to step S403. If this is not the case ("Yes" in step S402), the trap color decision portion 303 advances the processing to step S404.

Because the processing of steps S401 and S402 merely consider both the determination result relating to the target plate and the determination result relating to the K plate in order to decide the trap color of the target plate, the processing order thereof may be reversed.

In step S404, the trap color decision portion 303 sets the trap color to 0. Setting the trap color to 0 is synonymous with performing no trapping processing.

In step S403, the trap color decision portion 303 calculates and decides the pixel value (trap color) which should be distributed to the target pixel of the target plate based on the trapping information received with the determination result from the trap determination portion 302. For example, when the determination result indicating that the trapping processing should be performed by a pixel group (reference pixel group RG, see FIG. 9A) close to the target pixel is obtained, the trap color decision portion 303 decides a pixel value having the same concentration as that of the reference pixel or an equivalent concentration close to that of the reference pixel, as the trap color.

When the determination result indicating that the trapping processing should be performed by the pixel group (reference pixel group RG, see FIG. 9C) far from the target pixel is obtained, the trap color decision portion 303 decides a pixel value having a concentration lighter than that of the reference pixel as the trap color.

The trap color of the target plate is decided by the above-mentioned series of processing.

[Effect by Trapping Processing]

Figure 8A:
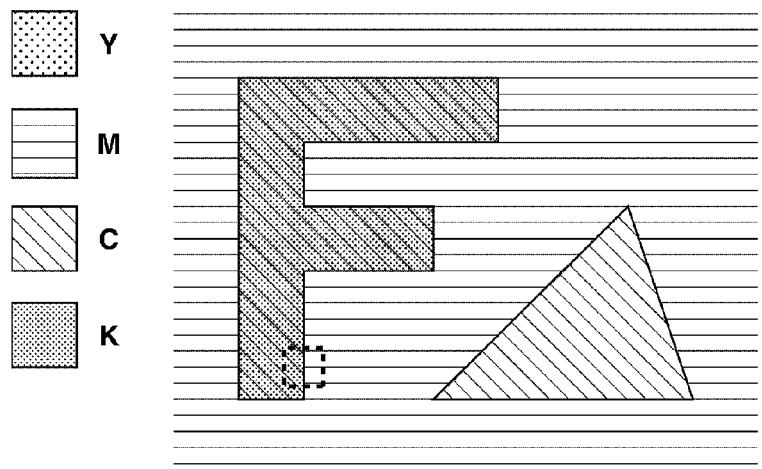
FIGS. 8A, 8B, and 8C describe trapping processing.

The effect of the trapping processing of the present exemplary embodiment will be described with reference to FIGS. 8A and 8C. FIG. 8A illustrates an image in which an image object (background) including the M plate is adjacent to an image object (character "F") including the image of the K plate and the image of the C plate. An arrangement pattern illustrating a positional relationship between color plates in a region surrounded with dashed lines of FIG. 8A is illustrated in FIG. 8C.

Hereinafter, a case where the trapping processing is applied on the image having the arrangement pattern of FIG. 8C will be described as an example. A dashed line extending in a longitudinal direction illustrated in FIG. 8C illustrates the boundary between the image object (character "F") and the image object (background) when the image objects are ideally arranged. In the following description, for ease of description, attention is directed to the M plate, the C plate, and the K plate, and the description for the Y plate is omitted.

Figure 8B:
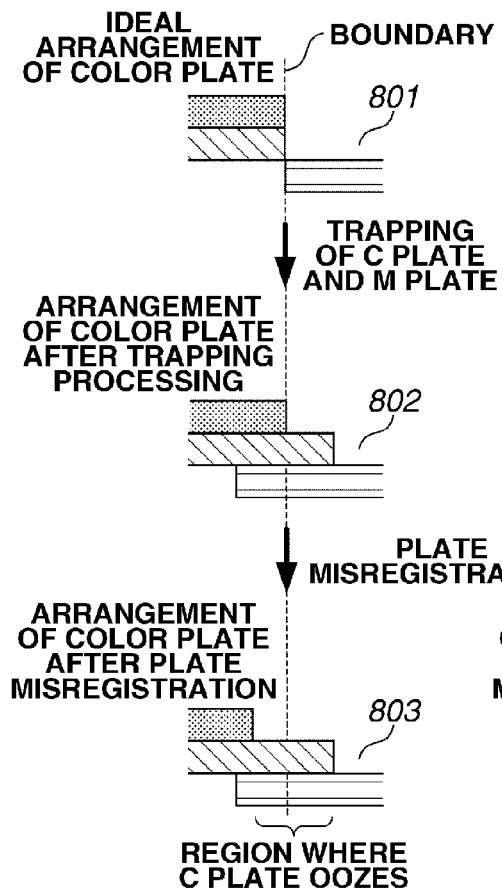
Figure 8C:
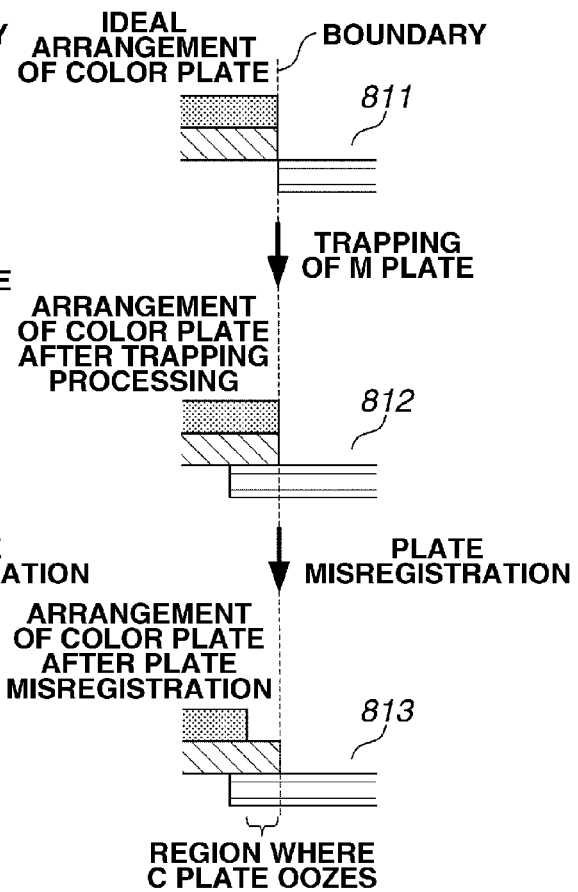

An arrangement pattern 811 of FIG. 8C illustrates arrangement of each color plate of the image input into the trapping processing portion. The arrangement pattern 811 illustrates the ideal arrangement of the color plate. First, the trap determination portion 302 performs the trap determination processing on the image.

Namely, the trap determination portion 302 determines that the trapping processing should not be performed on the C plate and the K plate which already have the image on the left side of the boundary (dashed line) of the arrangement pattern 811. The trap determination portion 302 determines that the trapping processing should be performed on the M plate having no image (FIG. 5). That is, because the M plate is determined as "Yes" in step S401 and "No" in step S402 on the left side of the boundary (dashed line) according to the processing of the flow chart of FIG. 4, the processing proceeds to step S403.

On the other hand, because the C plate and the K plate are determined as "No" in step S401, the processing proceeds to step S404. Therefore, the trap color is determined so that the trapping processing is performed only on the M plate, and the bitmap data is output so that the image object of only the M plate is extended from the right to the left as shown in an arrangement pattern 812 on the left side of the boundary (dashed line) of the arrangement pattern 811.

On the other hand, the trap determination portion 302 determines that the trapping processing should not be performed on the M plate which already has the image on the right side of the boundary (dashed line) of the arrangement pattern 811. The trap determination portion 302 determines that the trapping processing should be performed on the C plate and the K plate having no image (FIG. 5). That is, because the M plate is determined as "No" in step S401 according to the processing of the flow chart of FIG. 4, the processing proceeds to step S404.

On the other hand, because the C plate and the K plate are determined as "Yes" in step S401 and "Yes" in step S402, the processing proceeds to step S404, and the trapping processing is canceled. Therefore, the trap color is decided to be 0 so that the trapping processing is not performed on the M plate, the C plate, and the K plate. The bitmap data is output so that the image objects of the color plates of the C plate and the K plate are not extended from the left to the right as shown in the arrangement pattern 812 on the right side of the boundary (dashed line) of the arrangement pattern 811.

The arrangement pattern 812 after the trapping processing of the present exemplary embodiment is performed and an arrangement pattern 802 after conventional trapping processing is performed are contrasted with each other. Then, the image object of the M plate is extended from the left to the right on the right side of the boundary (dashed line) in the conventional arrangement pattern 802. On the other hand, the arrangement pattern 812 of the present exemplary embodiment is determinately different from the conventional arrangement pattern 802 in that the image object of the M plate is not extended on the right side of the boundary (dashed line).

Even if the plate misregistration is caused by such trapping processing when the image after the trapping processing is printed, the size of a color oozing region (a region where the C plate oozes) in an arrangement pattern 813 after the plate misregistration is caused can be made smaller than the conventional one (the arrangement pattern 803 of FIG. 8B). Because the region of the image object can be also extended as the image object of the M plate described above, a white spot can be also prevented.

Thus, the present exemplary embodiment decides the trap color of all the plates based on a trap determination result by treating the K plate as the target plate. As a result, a region where a plate overlapping with the K plate is extended and an unnatural color is generated can be suppressed, and the trapping processing can be performed.

Particularly, the processing of step S402 suppresses the trapping processing on the K plate, however, performs the trapping processing on the other color plate. Therefore, although the trapping processing of the present exemplary embodiment is performed on the color plate other than the K plate in order to prevent the white spot from the visual viewpoint, control can be performed to prevent the trapping processing on the K plate which has a big influence when the trapping processing is performed.

Further, whether to perform the trapping processing of the other color plate is controlled using the determination result relating to the K plate, and thereby the trapping processing on the color plate which overlaps with the K plate having the pixel value, i.e., the extension of a color region can be suppressed, and a change in a visual color can be suppressed to the minimum.

Further, in a region where the K plate does not exist (the K plate has no pixel value), the effect of the trapping processing for preventing the white spot is achieved.

Hereinafter, a trapping processing portion of a second exemplary embodiment will be described. In the first exemplary embodiment, parallel processing is performed on the plates from the Y plate to the K plate. When a trapping processing portion of the image processing portion 205 has a configuration enabling parallel processing similar to the first exemplary embodiment, a circuit cost is accordingly increased. Consequently, in the present exemplary embodiment, trap determination processing is first performed on a K plate, and then trap determination processing, trap color decision processing, and output processing are performed on a Y plate. Then, processing is similarly performed sequentially on a C plate and an M plate to reduce a processing resource of trapping processing.

If not otherwise specified, the configuration of the present exemplary embodiment is the same as that of the first exemplary embodiment. When the same reference numeral is used in the following description, the configuration is the same as that of the first exemplary embodiment, and the detailed description thereof is omitted.

[Configuration of Trapping Processing Portion]

Figure 6:
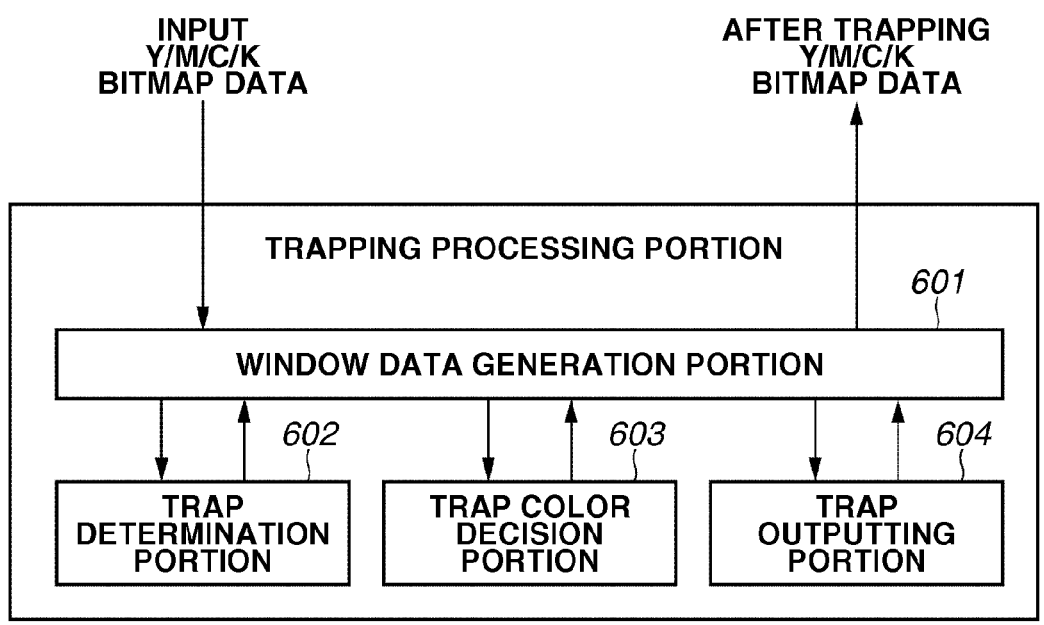
FIG. 6 describes the configuration of a trapping processing portion according to a second exemplary embodiment of the present invention.

The trapping processing portion which is a feature of the present exemplary embodiment will be described with reference to FIG. 6. FIG. 6 illustrates the configuration of the trapping processing portion configured to perform the trapping processing by treating any one color plate from the Y plate to the K plate as a target plate.

A window data production portion 601 produces bitmap data (hereinafter, window data) of N×N pixels using a data buffer (not illustrated) from bitmap data (Y plate, M plate, C plate and K plate) read from an image memory portion 204. Further, the window data production portion 601 transmits and receives the window data to/from a trap determination portion 602, a trap color decision portion 603, and a trap outputting portion 604, which will be described later. The data buffer stores a variable target indicating the target plate. Because processing performed by the trap determination portion 602 and the trap color decision portion 603 will be described later with reference to FIG. 7, the outline of the window data production portion 601 is described herein.

The trap determination portion 602 determines whether the trapping processing should be performed between the target plate and a reference plate when using any from the Y plate to the K plate as the target plate.

The trap color decision portion 603 determines a trap color of a target pixel when using each color plate as the target plate based on a determination result by the trap determination portion 602.

The trap outputting portion 604 outputs the bitmap data of a pixel value based on the decided trap color similar to the trap outputting portion 304.

Figure 7:
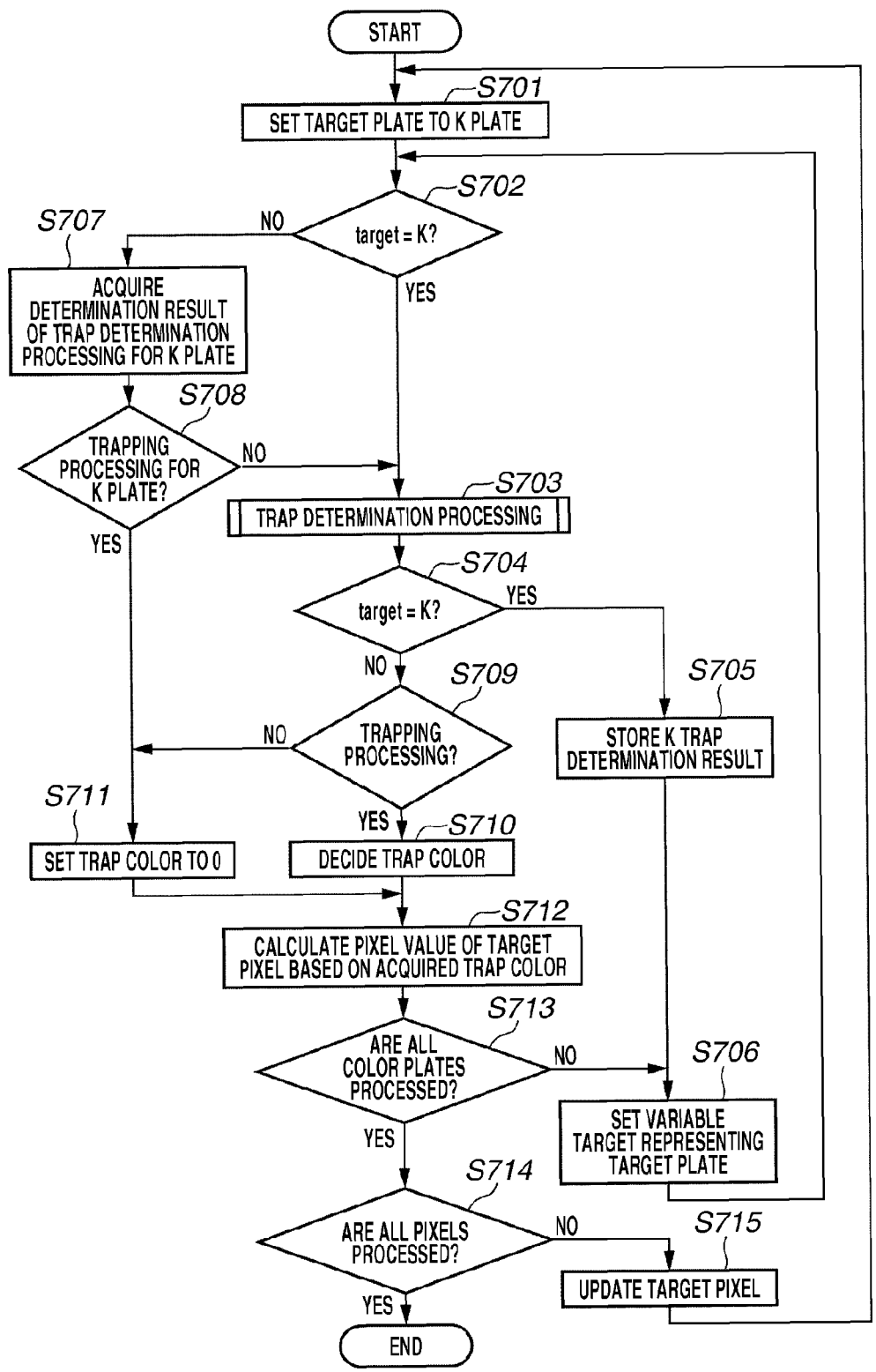
FIG. 7 describes trapping processing according to the second exemplary embodiment of the present invention.

FIG. 7 is a flow chart illustrating the processing of a trap processing portion illustrated in FIG. 6. The processing of the flow chart is controlled and executed by the image processing portion 205.

In step S701, the trap determination portion 602 sets the K plate to a first target plate. The trap determination portion 602 sets "K" which is information indicating the K plate to the variable target of the data buffer of the window data production portion 601.

In step S702, the trap determination portion 602 determines whether the variable target is K. When the variable target is K, the window data production portion 601 transmits the window data with a processing object pixel as a central pixel (target pixel) to the trap determination portion 602, and advances the processing to step S703.

In step S703, the trap determination portion 602 determines whether the trapping processing should be performed by treating a color plate indicated by the variable target as the target plate. Because determination processing (trap determination processing) performed herein is the same as that of the flow chart illustrated in FIG. 5, the description thereof is omitted. In step S703, the trap determination portion 602 stores the determination result of the trap determination processing and trapping information in the data buffer of the window data production portion 601.

In step S704, the trap determination portion 602 determines whether the variable target is K. When the variable target is K, the processing proceeds to step S705. Otherwise, the processing proceeds to step S709.

In step S705, the trap determination portion 602 stores the determination result of the trap determination processing on the K plate in the data buffer included in the window data production portion 601. The size of the data buffer storing the determination result for the K plate is a capacity for holding the determination result corresponding to at least one pixel. In this case, the trap determination portion 602 stores data indicating the pixel value of the target pixel of the K plate in the data buffer of the window data production portion 601.

When using the K plate for the target plate, after the trap determination processing, the trap determination portion 602 sets the variable target indicating the target plate in step S706 to information indicating a color plate other than the K plate in order to continue processing using a color plate other than the K plate as the target plate, and advances the processing to step S702. The trap determination portion 602 resets the variable target to a variable other than K, and thereby in step S702, the trap determination portion 602 advances the processing to step S707.

Thus, the trap determination portion 602 resets the information indicating the color plate, and thereby the trapping processing portion of the present exemplary embodiment performs processing on a first color plate other than the K plate, and then sequentially performs processing on a second color plate other than the K plate and the first color plate.

In step S707, the trap determination portion 602 acquires the determination result of the trap determination processing on the K plate stored in the data buffer in step S705.

In step S708, the trap determination portion 602 determines whether the determination result on the K plate acquired in step S707 indicates that the trapping processing should be performed. When the determination result indicates that the trapping processing should not be performed, the trap determination portion 602 advances the processing to step S703.

The trap determination portion 602 determines whether the trapping processing should be performed on the color plate indicated by the current variable target using the window data received in step S702. On the other hand, when the determination result on the K plate indicates that the trapping processing should be performed, the trap determination portion 602 advances the processing to step S711.

When the variable target is not K in step S704, in step S709, the trap determination portion 602 determines whether the determination result of the trap determination processing of step S703 indicates that the trapping processing should be performed. When the determination result indicates that the trapping processing should be performed, the trap determination portion 602 advances the processing to step S710. On the other hand, when the determination result indicates that the trapping processing should not be performed, the trap determination portion 602 advances the processing to step S711.

When the processing proceeds to step S711, the trap color decision portion 603 determines that the trapping processing is not performed on the color plate indicated by the variable target, and sets the trap color to 0. This processing is the same as that of step S404 of the first exemplary embodiment. On the other hand, when the processing proceeds to step S710, the trap color decision portion 603 decides the trap color similar to the processing of step S403 of the first exemplary embodiment. In steps S710 and S711, the trap color decision portion 603 acquires the determination result and the trapping information from the data buffer of the window data production portion 601, and decides the trap color. The trap color decision portion 603 stores the decided trap color in the data buffer of the window data production portion 601.

In step S712, the trap outputting portion 604 outputs the bitmap data of the pixel value based on the trap color similar to the processing performed by the trap outputting portion 304 of the first exemplary embodiment. In this case, the trap outputting portion 604 acquires the trap color stored in the data buffer in step S710 or S711, calculates the pixel value of the target pixel of the color plate indicated by a variable target based on the acquired trap color, and outputs the data. The data output by the trap outputting portion 604 is stored in the data buffer of the window data production portion 601.

Next, in step S713, the window data production portion 601 confirms the variable target, and determines whether processing of steps S701 to S712 is performed on all the color plates of the processing object target pixel. When processing on all the color plates is completed, the window data production portion 601 outputs the bitmap data having pixel value data from the Y plate to the K plate stored in the data buffer. The processing proceeds to step S714. If this is not the case, the processing proceeds to step S706, and processing is repeated on the next color plate.

In step S714, the window data production portion 601 determines whether processing has been performed on all the pixels corresponding to one page or one band as the processing object target pixel. When the window data production portion 601 determines that processing has been performed on all the pixels, the window data production portion 601 ends the processing of the trapping processing portion. When the pixel on which processing has not yet been performed exists, the processing proceeds to step S715, and the target pixel is updated. The window data production portion 601 produces the window data treating the next pixel as the central pixel (target pixel) to update the target pixel.

Thus, the present exemplary embodiment enables the trapping processing by employing a less processing resource in addition to the effect obtained by the first exemplary embodiment.

Because a method of the present exemplary embodiment does not require a complicated circuit configuration as described above, it is comparatively easy to realize a processing portion having an equivalent function, as a software module on a host computer. The host computer performs various types of processing including trapping processing and halftone processing on print data, and transmits the processed data to an image forming apparatus.

When the software module is applied to a host base system which can merely print the received data, by effectively using the computational capacity of the host computer, a high quality image on which the trapping processing has been performed can be obtained also in an inexpensive image forming apparatus having no trapping processing function.

In the first exemplary embodiment, the same trap determination processing performed on the Y plate, the M plate, and the C plate is performed also on the K plate, and the trapping processing on the plates from the Y plate to the C plate is controlled using the determination result of the K plate. In the present third exemplary embodiment, trapping processing having the same effect as that of the first exemplary embodiment without performing trap determination processing on the K plate will be described.

The present exemplary embodiment is characterized in that the trap determination processing and the trap color decision processing are not performed on the K plate, and step S902 (described later) is performed in place of the processing of step S402 of FIG. 4. The description of the other configuration is omitted because the configuration is the same as that of the first exemplary embodiment. Because the trap color decision processing is not performed on the K plate, the bitmap data of the processing object pixel of the K plate is output as it is.

Processing of step S902 will be described. When the trap color decision processing is performed in the case where a color plate other than the K plate is used as the target plate, the processing of step S902 refers to a reference pixel group RG in the target plate to determine whether the pixel concentration of the K plate of the reference pixel group RG is deep. Specifically, when a number of a pixel value equal to or greater than a predetermined threshold value is equal to or greater than a predetermined number with respect to the pixel value of the K plate constituting the reference pixel group RG, the processing proceeds to step S404. If this is not the case, the processing proceeds to step S403. This is synonymous with determining whether the color plates (from Y plate to M plate) on which the trapping processing should be performed overlap with the K plate (see the left side of the boundary of an arrangement pattern 811 of FIG. 8C) to constitute an image.

The same effect as that of the first exemplary embodiment can be obtained without performing the trap determination processing on the K plate, by performing step S902 in place of step S402 of FIG. 4. The speed of the processing of the trapping processing portion can be increased since the trap determination processing and the trap color decision processing are not performed on the K plate.

Other Embodiment

Although whether to perform the trapping processing of the other color plate including the K plate is decided using the determination result of the trap determination processing on the K plate in the above-mentioned embodiments, the present invention is not limited thereto. For example, whether to perform the trapping processing of the other color plate including a predetermined color plate may be decided by using the result of the trap determination processing on the predetermined color plate by treating a color plate other than the K plate as the predetermined color plate.

For example, a case is considered where an image object including the two color plates (for example, the M plate and the C plate are set, and the M plate is defined as the predetermined color plate) is adjacent to an image object including the color plate (for example, the Y plate) other than the two color plates. The region extension of only the C plate by the trapping processing can be prevented and the region of the Y plate can be extended by applying the present invention in this case. Accordingly, greenish color oozing caused by the overlap of the C plate and the Y plate produced by the plate misregistration can be suppressed, and the white spot can be suppressed. Therefore, the present invention can be applied to at least one color plate of the two or more color plates as the predetermined color plate when the trapping processing is performed on the image which is constituted of the image object including two or more color plates.

The trapping processing portion including the plurality of processing portions is described in the above-mentioned embodiments. However, the present invention is not limited thereto. That is, one processing portion may execute the processing performed by the trapping processing portion of the above-mentioned embodiments.

The present invention may be applied to a system including a plurality of equipments (for example, a host computer, an interface equipment, a reader, and a printer, etc.), or a device (for example, a copying machine and a facsimile machine, etc.) including an equipment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-272156 filed Dec. 13, 2011, which is hereby incorporated by reference herein in its entirety.

What is claimed is:

1. An image processing apparatus comprising:
    an acquisition unit configured to acquire image data including a first pixel and a second pixel adjacent to the first pixel, wherein a concentration of a first color component of the first pixel is deep and a concentration of the second color component of the first pixel is light, while a concentration of the first color component of the second pixel is light and a concentration of the second color component of the second pixel is deep;
    a process unit operative to perform a first process of increasing the concentration of the first color component of the second pixel and to perform a second process of increasing the concentration of second color component of the first pixel;
    a determination unit configured to determine a concentration of a third color component of the first pixel and a concentration of the third color component of the second pixel; and
    a control unit configured to control the process unit to perform, without increasing the concentration of the third color component of the second pixel, the second process and not to perform the first process on the basis of a determination by the determination unit that the concentration of the predetermined color component of the first pixel is deep and the concentration of the third color component of the second pixel is light.

2. The image processing apparatus according to claim 1, wherein the process unit comprises:
    a first process unit capable of performing the first process; and
    a second process unit capable of performing the second process, wherein
    on the basis of the determination by the determination unit that the concentration of the third color component of the first pixel is deep and the concentration of the third color component of the second pixel is light, the control unit is configured to control the first process unit not to perform the first process and to control the second process unit to perform the second process.

3. The image processing apparatus according to claim 2, wherein:
    the process unit further comprises a third process unit capable of performing a third process of increasing the concentration of the third color component of the second pixel, and
    the control unit is configured to control the third process unit not to perform the third process.

4. The image processing apparatus according to claim 1, wherein the process unit is configured to not change the concentration of the first color component of the second pixel by the control unit controlling the process not to perform the first process.

5. The image processing apparatus according to claim 1, wherein the process unit is configured to replace the concentration of the second color component of the first pixel with the concentration of the second color component of the second pixel by the control unit controlling the process unit to perform the second process.

6. The image processing apparatus according to claim 1, further comprising another determination unit configured determine whether the first process is to be performed independently of the determination unit, wherein in a case where the another determination unit determines that the first process is to be performed, the control unit controls the process unit to cancel the determination result of the another determination unit and not to perform the first process on the basis of the determination by the determination unit that the concentration of the third color component of the first pixel is deep and the concentration of the third color component of the pixel is light.

7. The image processing apparatus according to claim 1, further comprising another determination unit configured to determine whether the first process is to be performed independently of the determination unit, wherein the control unit controls the another determination unit not to operate on the basis of the determination by the determination unit that the concentration of the third color component of the first pixel is deep and the concentration of the third color component of the second pixel is light.

8. The image processing apparatus according to claim 1, wherein the control unit is configured to control the process unit to perform the first process and the second process on the basis of a determination by the determination unit that the concentration of the third color component of the first pixel is light and the concentration of the third color component of the second pixel is light.

9. The image processing apparatus according to claim 1, wherein the control unit is configured to control the process unit not to perform the first process or the second process on the basis of a determination by the determination that the concentration of the third color component of the first pixel is deep and the concentration of the third color component of the second pixel is deep.

10. The image processing apparatus according to claim 1, wherein the image data acquired by the acquisition unit is bitmap data including a plurality of pixels each having a concentration value corresponding to a plurality of color components, including the first, second, and third color components.

11. The image processing apparatus according to claim 1, wherein each of the first, second, and third color components corresponds to a different process color.

12. The image processing apparatus according to claim 1, wherein the third color component corresponds to a black process color.

13. The image processing apparatus according to claim 1, wherein in a case where a concentration of any of the first, second, and third color component is deep, the concentration value of the first, second, or third color component is equal to or greater than a threshold value, and in a case where the concentration of any of the first, second, or third color components is light, the concentration is smaller than the threshold value.

14. The image processing apparatus according to claim 1, further comprising a printing unit configured to perform printing based on the image data on which the control has been performed.

15. The image processing apparatus according to claim 1, further comprising a halftoning unit configured to perform halftone processing on the image data on which the control has been performed.

16. An image processing method comprising:
acquiring image data including a first pixel and a second pixel adjacent to the first pixel, wherein a concentration of a first color component of the first pixel is deep and a concentration of the second color component of the first pixel is light, while a concentration of the first color component of the second pixel is light and a concentration of the second color component of the second pixel is deep;
a determination unit configured to determine a concentration of a third color component of the first pixel and a concentration of the third color component of the second pixel; and
controlling to perform, without increasing the concentration of the third color component of the second pixel, a second process of increasing the concentration of the second color component of the first pixel and not to perform a first process of increasing the concentration of the first color component of the second pixel on the basis of a determination by the determination unit that the concentration of the predetermined color component of the first pixel is deep and the concentration of the third color component of the second pixel is light.

17. The image processing method according to claim 16, further comprising performing printing based on the image data on which control has been performed.

18. The image processing apparatus according to claim 16, further comprising performing halftone processing on the image data on which the control has been performed.

19. A non-transitory computer readable storage medium storing a computer-executable program that causes a computer to execute an image processing method, the method comprising:
acquiring image data including a first pixel and a second pixel adjacent to the first pixel, wherein a concentration of a first color component of the first pixel is deep and a concentration of the second color component of the first pixel is light, while a concentration of the first color component of the second pixel is light and a concentration of the second color component of the second pixel is deep;
a determination unit configured to determine a concentration of a third color component of the first pixel and a concentration of the third color component of the second pixel; and
controlling to perform, without increasing the concentration of the third color component of the second pixel, a second process of increasing the concentration of the second color component of the first pixel and not to perform a first process of increasing the concentration of the first color component of the second pixel on the basis of a determination by the determination unit that the concentration of the predetermined color component of the first pixel is deep and the concentration of the third color component of the second pixel is light.

20. The computer readable storage medium according to claim 19, wherein the image processing method further comprising performing halftone processing on the image data on which the control has been performed.

21. The computer readable storage medium according to claim 19, wherein the image processing method further comprising performing printing based on the image data on which control has been performed.

* * * * *